United States Patent [19]

Frangipane et al.

[11] Patent Number: 5,425,973
[45] Date of Patent: Jun. 20, 1995

[54] INTEGRAL OVERWRAP SHIELD

[75] Inventors: John R. Frangipane, Huntington Beach; Steven F. Stone, Irvine; Robert F. Reizer, Stanton, all of Calif.

[73] Assignee: McDonnell Douglas Corporation, Huntington Beach, Calif.

[21] Appl. No.: 813,999

[22] Filed: Dec. 27, 1985

[51] Int. Cl.⁶ .................. B32B 25/02; F41H 5/00; B27N 5/02
[52] U.S. Cl. ................... 428/35.7; 428/902; 252/478; 89/36.01
[58] Field of Search ............. 89/36.01, 36.02; 428/35, 902; 376/339; 252/478; 250/518.1, 519.1

[56] References Cited

U.S. PATENT DOCUMENTS

| | | | |
|---|---|---|---|
| 2,796,529 | 6/1957 | Morrison | 250/108 |
| 4,173,187 | 11/1979 | Steverding | 102/105 |
| 4,176,093 | 11/1979 | Zoch | 252/478 |
| 4,365,029 | 12/1982 | Reizer et al. | 523/437 |
| 4,428,988 | 1/1984 | Adinamis | 428/8 |
| 4,428,998 | 1/1984 | Hawkinson | 428/240 |
| 4,550,129 | 10/1985 | Nir et al. | 523/433 |
| 4,588,778 | 5/1986 | Nir et al. | 525/115 |
| 5,196,228 | 3/1993 | Kirby et al. | 427/515 |

FOREIGN PATENT DOCUMENTS 1219696  1/1971  United Kingdom .......... G21C 7/10

OTHER PUBLICATIONS

Army Research, Development and Acquisition Magazine Jul.–Aug., 1990, p. 7.

Primary Examiner—Donald P. Walsh
Assistant Examiner—John N. Greaves
Attorney, Agent, or Firm—John P. Scholl; Roger Turner

[57] ABSTRACT

An integral overwrap protective system for a vehicle, e.g., a missile. Includes a filament wound fiber reinforced rubber matrix over a fiber-reinforced composite laminate which forms the vehicle inner skin and a final elastomeric outer coating. The integral overwrap avoids the bonding between vehicle skin and the protective system as in the present systems.

12 Claims, 1 Drawing Sheet

INTEGRAL OVERWRAP SHIELD

BACKGROUND OF THE INVENTION

This invention relates to external protection material for the outside skin structure of vehicles, e.g., missiles and space vehicles, which must resist multi-environmental conditions.

Missiles and space vehicles must have an external protection system which must endure not only normal handling procedures before launch but the launch environments as well as in-flight environments. The prelaunch environment is reasonably obvious. However, the launch environment includes the requirement to survive a launch immediately after a direct hit at the launch site while the immediate atmosphere is full of relatively large particles of debris, shock waves, and the x-rays produced by an atomic explosion which produce large impulsive mechanical loads. The in-flight environment, although it may include rain, dust, and micro meteorites, is generally a thermal problem including both heat generated by radiation and aerodynamic heating.

While all materials ablate when subjected to sufficient heat, what is required is a material that ablates at a rate that matches the heat input which is generated as a result of endo-atmospheric and exo-atmospheric radiation combined with the aerodynamic heating. The material system should have a relatively low thermal conductivity to avoid overheating the vehicle structure while having an ablative energy or heat of transformation to match the heat input. Also, the protective material which remains after partical ablation must protect the vehicle during its final environment. At the same time, the material system must be resilient and tough enough to absorb the impact of foreign objects, shock waves, X-ray impacts, etc. without undue penetration or tearing away.

Prior art history of these protective material systems includes U.S. Pat. No. 4,365,029, assigned to the same assignee as the present invention, which was a black copolymer made by combining an ethylene acrylic elastomer with polyvinyl chloride and carbon black to form an abrasion resistant coating. This material may be calendared into sheet stock or is used, i.e., as repair coating or as an adhesive. In sheet form this material is a "bond-on" and was actually the forerunner to Vamac 22B. Vamac 22B is a "bond-on" and is the external protection material used on a known missile 'X'. It is also the baseline material used herein for comparative test analysis purposes. Vamac$^R$ is a registered trademark for an ethylene acrylic type elastomeric polymer manufactured by the DuPont Chemical Company. Vamac 22B is a modified rubber elastomeric polymer and will be described in detail infra.

U.S. Pat. No. 4,428,998 is a typical laminate of fabric plies coated with finely divided microspheres, all of which are fabricated as a laminate and bonded to the missile skin. This reference does teach an elastomeric material, but not with the present modifiers, uses fabric plies, and is a "bond-on."

U.S. patent application Ser. No. 581,186, now U.S. Pat. No. 5,196,228 and assigned to the same assignee as the instant case, teaches a polysiloxene elastomer with, among other modifiers, boron nitride which is also a modifier in the present invention.

Assignee's U.S. patent application Ser. No. 813,911, currently pending before the United States Patent Office, is another "bond-on" of a material system comprising a carbon based ethylene acrylic elastomer followed by an aramid cloth and finally a white boron nitride based elastomer as the outside coating.

Assignee's U.S. patent application Ser. No. 813,812, currently pending as a patent application, incorporated herein by reference, teaches a prepreg wherein a yarn is preimpregnated with an ethylene acrylic elastomer modified with Kevlar$^R$ pulp, a registered trademark of the DuPont Chemical Company, and boron nitride which is a material which was specifically invented to accommodate the subject invention.

One object of the present invention is to provide an integral overwrap of an elastomeric material system directly on the missile skin or substrate voiding the bonding on step required of a prefabricated and a pre-cured material system.

It is a further object of the present invention to provide an integral overwrap protective material for a missile which is co-cured with the missile skin or substrate.

It is a further object of the present invention to provide an integral overwrap of the missile skin for a protective system which may be wet wrapped or dry wrapped using a prepreg which may be further protected by a final elastomeric coating.

SUMMARY OF THE INVENTION

In summary, the noted objects are achieved in the material protection system of this invention by providing a continuous filament fiber impregnated with an elastomeric polymer modified with Kevlar pulp and boron nitride which is integrally overwrapped on the substrate, which is typically a resin impregnated uncured filament or cloth lay-up, preferably in the uncured state. The substrate and the integral overwrap are then co-cured to the missile's structure and finally coated with an elastomeric polymer modified with boron nitride.

The material system of this invention provides all of the benefits of the prior art and eliminates the need for an additional attachment mechanism between the protective material and the missile skin or substrate.

BRIEF DESCRIPTION OF THE DRAWINGS

The FIGURE shows a schematic sectional view of the protective material integrally wrapped on the missile substrate.

DETAILED DESCRIPTION OF THE INVENTION AND PREFERRED EMBODIMENT

Figure 1:
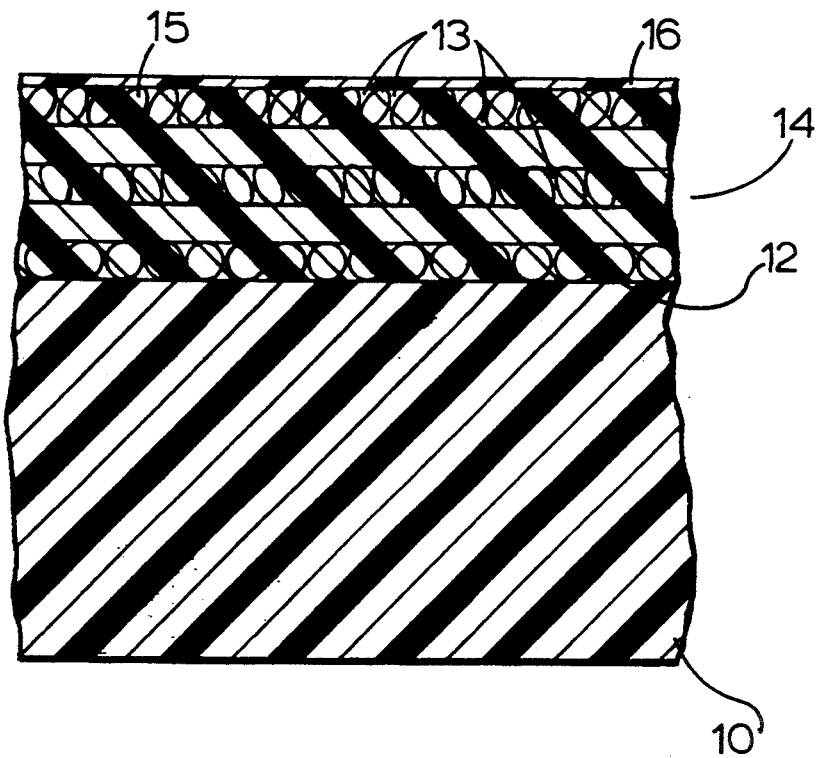

The FIGURE is a schematic cross-sectional view of the external protection material system which is a continuous fiber which has been pre-impregnated with an elastomeric polymer which has been modified to change its characteristics, and this continuous fiber is integrally overwrapped about the missile skin or substrate. The skin is also a resin impregnated filament or cloth lay-up, typically graphite epoxy. Both systems are co-cured to the missile's structure or to form that portion of the missile structure, as the case may be, and finally coated with an elastomeric polymer which also has been modified.

The external protection material system generally comprises an inner skin 10 which is typically the missile skin and is usually graphite or Kevlar epoxy, but may be any fiber or cloth impregnated with a resin that is suitable, or a metal. It may be wet wound or B-staged which, in the case of a non-elastomer, is a fiber with a pre-impregnated resin which has been partially cured. Integrally overwrapped on the skin 10 is the fiber reinforced rubber matrix 14. While any suitable fiber may be used, typically graphite or Kevlar fibers are used and are shown at 15. Space between the fibers 13 is the rubber matrix which is an elastomeric polymer modified with Kevlar pulp and boron nitride. Boron nitride is a whitener and gives the fiber reinforced rubber matrix the characteristic that it chars white when ablated so that it continues to reflect radiant energy. A rubber matrix, modified as noted, can be applied in a typical wet wrap process, well known in the art, wherein the fiber is dipped in the wet matrix during the wrapping process or the fiber may be pre-impregnated with the rubber matrix and then the solvents are removed so as to leave the rubber matrix in the uncured state as taught in pending U.S. patent application identified as Assignee's U.S. patent application Ser. No. 813,812, incorporated herein by reference. The line at the interface between 10 and 14 is identified as the bond line 12 simply because in the prior art this would be a bond line and that was where the thermocouple was placed during test to determine the temperature at this point for test comparisons. There is no bonding agent added at this interface unless the vehicle skin has been previously cured.

Finally, an outer coating, an elastomeric polymer modified with boron nitride, is applied to provide a smooth outer white elastomeric coating 16. The outer coating 16 must be cured separately from the rubber matrix 14 as it is applied as a liquid and hence must be applied to a cured surface.

The invention will be further clarified by consideration of the following examples of modified elastomeric polymers used to make the material protection system of this invention and are intended to be exemplary of the use of the invention. The preferred elastomer formula data is set out in the following table along with the material identified as Vamac 22B which was the control substance for comparative analysis during test as it is a protective material used on the missile 'X' for which a substantial amount of data is available.

While the modified elastomeric polymer identified as Vamac 139C is used in the preferred embodiment of the invention, the system was first made and tested using Vamac 140A. In both cases the same modified elastomeric polymer was used in the fiber reinforced rubber matrix layer 14 and the outer coating 16. However, in the preferred embodiment Vamac 28 is used as the outer coating 16.

TABLE

| INGREDIENT | FORMULA DATA FOR MATERIALS | | | |
|---|---|---|---|---|
| | VAMAC 22B | VAMAC 139C | VAMAC 140A | VAMAC 28 |
| Vamac G Polymer | — | 100.0 | 100.0 | 100.0 |
| Vamac B-124 | 124.0 | — | — | — |
| N339 Black | 20.0 | — | — | — |
| Naugard 445 | — | 2.0 | 2.0 | — |
| Kevlar 29 Pulp (Dried) | — | 6.5 | — | — |
| Boron Nitride | — | 20.0 | 20.0 | 60.0 |
| TiO$_2$ | — | 3.0 | 3.0 | 3.0 |
| DEN Resin 438 | — | 10.0 | 10.0 | — |
| DPG | 4.0 | 4.0 | 4.0 | 4.0 |
| Diak #1 | 1.25 | 1.25 | 1.25 | 2.0 |
| Armeen 18D | 1.0 | — | — | — |
| Vanfre UN | 0.5 | — | — | — |
| Stearic Acid | 0.5 | — | — | — |
| BDMA | — | 0.2 | 0.2 | — |

In the examples, all parts, percentages and proportions are given by weight. Vamac G, which is an ethylene acrylic rubber made by DuPont, was placed in a piece of mixing equipment, either a rubber mill or Banbury internal mixer, and mixed for about one minute with the blade gap set at 0.075 inches so as to band and warm up the rubber. Naugard 445, an anti-oxidant, was then placed in the mixer with the elastomeric material and mixed for approximately a minute. The Naugard protects the rubber from oxidizing during the entire process. In the case of the Vamac 139C polymer of the preferred embodiment, Kevlar 29 pulp in the noted amount (previously dried for 16 hours at approximately 250° F. so as to drive off the approximately ten percent moisture normally in the Kevlar), is placed in the mill set at 0.005 inch gap and mixed for 12 to 15 minutes. This step is omitted in the Vamac 140 A polymer as the Kevlar pulp is omitted. Boron nitride was then added to the mixer with the mixer gap set at 0.100 inches and mixed for 15 minutes so as to comminute the entire mix. After the mix was cooled down, Titanium dioxide was added to the mixture and with the mixer blades set at 0.075 inches, was further mixed for five minutes. Finally, the Dow epoxy novolak (DEN) 438 resin, a product of Dow Chemical Company, was added along with its curing agent BDMA (benzyl-dimethylamine) along with the rubber curing ingredients Diak No. 1 (hexameythlene diamine carbamate) manufactured by DuPont Chemical Company and the DPG (dipheynl guanidine), which is an accelerator, were combined with the above, mixed and calendared into sheets and then chopped up into pieces approximately one-half by one inch. The chopped pieces were then placed in a sigma blade mixer along with solvents which include MEK (meythl eythl ketone), MIBK keytone (meythl isobutyl) and eythl acetate. The combination with the solvents was mixed and allowed to sit 16 hours so that the rubber swells and goes into solution. This solution, containing 10% to 40% solid content, must have the consistency and viscosity suitable for the impregnating system to be used. In the case of the wet wrap, the continuous filament fiber is simply dipped in the solution during the winding process. In the case of the elastomeric prepreg as taught in U.S. patent application identified as Assignee's U.S. patent application Ser. No. 813,812, the volatiles or solvents must be driven off to make the prepreg.

The processes available to make the fiber-reinforced composite laminates of the inner skin 10 are well known and within the basic knowledge of the the artisan and need no further discussion here. However, in most missiles this is either a graphite epoxy laminate or a Kevlar epoxy laminate.

Also, the continuous filament winding operation, generally, whether wet or dry, to fabricate the fiber reinforced rubber matrix layer 14 is well known in the art and requires no further discussion here. Of course, the windings are oriented axially, hoop, and diagonally.

The fiber-reinforced composite of the inner skin 10 and the fiber reinforced rubber matrix layer 14 are co-cured in a heated press for 30 minutes at 350° in either the wet or dry layup. Of course, if wet wound, special environmental control equipment must be provided to control the volatile solvents driven off in the curing process which is not required in the case of the elastomeric prepreg.

After co-curing skin 10 and layer 14, a thin layer of the modified Vamac polymer, designated Vamac 28, is applied as an external coating following any of the conventional methods, and cured. Typically, a fiber-reinforced composite laminate inner skin 10 is approximately 0.200 inches thick, the fiber reinforced rubber matrix layer 14 is 0.100 inches thick, and the final elastomeric polymer coating 16 is 0.010 inches thick. Obviously, these thickness may be varied depending upon the particular environmental requirements of each application.

The embodiment including the composite layup of 0.100 inch of graphite fiber wet-wound with the Vamac 140A polymer over 0.200 inches of graphite epoxy and a final outer coating of 0.010 Vamac 140A was tested in a facility which simulated thermal radiation and forced convective heating representative of missile flight trajectories. The system out performed Vamac 22B as follows:

60%-70% of incident radiation was reflected within the white/black composite compared to a minimal 0-5% reflection by Vamac 22B.

25%-40% decrease in bondline temperature (interface between 0.100 inches of design shield and graphite epoxy sublayer) compared to Vamac 22B at same conditions.

Minimal increase in bondline temperature when fluence was doubled from previous nominal of 45 cal/cm$^2$ to 108 cal/cm$^2$, with minimal (0.010 inches) ablation (material removal).

Another series of tests were performed that evaluated the hardness of the item in a pebble impact environment simulation. A previous data base for Vamac 22B of approximately 600 shots had concluded that Vamac 22B will be cut through by pebble rocks to a nominal depth of 0.110 inches±0.010 inches out of 0.140 inches. The integral overwrap showed an improvement down to a cutting depth of only 0.010 inches to 0.030 inches out of 0.080 inches.

It is intended that this specification and the examples used herein be considered as exemplary only, with the true scope and spirit of the invention being indicated by the following claims.

What is claimed is:

1. An integral missile overwrap material protection and motor case system comprising:
   a fiber-reinforced composite laminate formed into a shape having a cavity inside;
   a continuous filament pre-impregnated with a rubber matrix continuously wound about and over and co-cured in place with said fiber-reinforced composite laminate so as to form an integral overwrap; and
   a smooth elastomeric polymer coating over said continuous filament winding.

2. The integral overwrap material protection system of claim 1 wherein said rubber matrix is an ethyleneacrylic polymer modified with aramid fiber pulp and boron nitride powder.

3. The integral overwrap material protection system of claim 2 wherein said smooth elastomeric coating is an ethyleneacrylic polymer modified with 20–60 parts of boron nitride powder by weight.

4. The integral overwrap material protection system of claim 2 wherein said continuous filament is an aramid fiber.

5. The integral overwrap material and motor case system of claim 1 wherein said continuous filament is pre-impregnated with a wet rubber matrix.

6. The integral overwrap material protection and motor case system of claim 1 wherein said continuous filament is pre-impregnated with a rubber matrix from which the solvents have been removed so as to form a dry pre-preg.

7. The integral overwrap material protection system of claim 1 wherein said rubber matrix is an ethyleneacrylic polymer modified with aramid pulp.

8. The integral overwrap material protection system of claim 1 wherein said continuous filament impregnating rubber matrix and said smooth elastomeric coating over said continuous filament winding are the same ethylene-acrylic polymer modified by the addition of boron nitride powder.

9. A method of making an integral missile overwrap material protection and motor case system over a cast sand mold which conforms to the desired solid propellant shape which comprises:
   wrapping cured insulation rubber about said cast sand mold;
   wrapping said rubber insulation with fibers impregnated with resin so as to produce a fiber-reinforced composite laminate surrounding said rubber insulation;
   winding a continuous filament pre-impregnated with a rubber matrix over said reinforced composite laminate;
   co-curing said fiber reinforced composite laminate and said continuous filament pre-impregnated with said rubber matrix at elevated temperature and pressure;
   applying a smooth elastomeric polymer coating over said continuous filament winding; and
   curing said smooth elastomeric polymer coating at elevated temperature; and
   removing said cast sand mold.

10. The method of making an integral missile overwrap material protection and motor case system of claim 9 wherein said continuous filament is pre-impregnated with a wet rubber matrix.

11. The method of making an integral missile overwrap material protection and motor case system of claim 9 wherein said continuous filament is pre-impregnated with a rubber matrix from which the solvents have been removed so as to form a dry pre-preg.

12. The method of making an integral missile overwrap material protection and motor case system of claim 9 wherein said rubber matrix is modified with aramid pulp and boron nitride powder.

* * * * *